United States Patent Office 3,006,928
Patented Oct. 31, 1961

---

3,006,928
19-NOR-TESTERONE-17-TRANSHEXAHYDRO-
TEREPHTHALATE
Andre Allais, Paris, and Charles Hoffmann, Noisy le
 Grand (Seine and Oise), France, assignors to Les La-
 boratoires Francais de Chimiotherapie, Paris, France, a
 corporation of France
No Drawing. Continuation of applications Ser. No.
 596,166, July 6, 1956, now Patent No. 2,959,601, dated
 Nov. 8, 1960, and Ser. No. 700,264, Dec. 3, 1957, now
 abandoned. This application Apr. 5, 1960, Ser. No.
 20,021
Claims priority, application France Dec. 10, 1956
1 Claim. (Cl. 260—397.4)

This invention relates to a method of preparing new acylated derivatives of steroid hormones, and more particularly to a method of preparing acylated derivatives of steroid hormones which are distinguished by prolonged activity and by satisfactory solubility in vegetable oils which are used as the injecting medium.

The present application is a continuation of our co-pending applications Serial No. 596,166, filed July 6, 1956, now U.S. Patent No. 2,959,601, and entitled "Acylated Derivatives of Steroid Hormones and Process of Preparing Same" and Serial No. 700,264, filed December 3, 1957, now abandoned and entitled "Acylated Derivative of a Steroid Hormone and Method of Preparing Same."

Many esters of steroid hormones, such as of steroid hormones with estrogenic, androgenic, progestational, adrenocortical, anabolic, renotropic, and the like activity are known. However, none of these esters meet all the requirements of the medical profession with respect to solubility, prolonged activity, satisfactory effectiveness etc. It is, therefore, of the greatest importance to provide esters which are superior to the known esters.

It is one object of the present invention to provide such new and superior acylated derivatives of steroid hormones.

Another object of the present invention is to provide a simple and effective process of producing such new and valuable acylated derivatives of steroid hormones.

These new products are according to the present invention derivatives of trans-hexahydroterephthalic acid of the formula

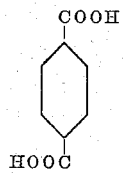

in which one of the carboxyl groups has been previously esterified by an aliphatic alcohol. The new esters thus correspond to the following formula

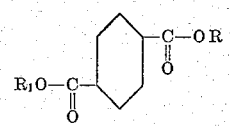

wherein

R indicates an alkyl radical with 1 to 8 carbon atoms and R₁ indicates the radical of a steroid hormone carrying a hydroxyl group, esterified by said trans-hexahydroterephthalic mono-alkyl ester.

The new esters are preferably prepared by esterification methods known per se, for instance, by the reaction of the acid chloride of a trans-hexahydroterephthalic hemiester

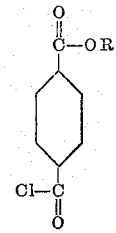

with the hydroxylated steroid hormone in the presence of a tertiary base, such as pyridine, methylethyl pyridine, triethylamine, or others, the operation being carried out at room temperature or while heating. A suitable inert solvent such as benzene, toluene, ether, petroleum ether, and the like may be present during esterification. After esterification is completed, the reaction mixture is taken up with a solvent which is not miscible with water, is then washed with diluted mineral acids such as hydrochloric acid, sulfuric acid, nitric acid, thereafter with an alkaline agent such as sodium carbonate, potassium carbonate, sodium bicarbonate, potassium bicarbonate, and finally with water. After drying the washed solution and distilling off the solvent, the resulting mixed hexahydroterephthalic acid di-ester is obtained in the crude state and is purified by recrystallization or chromatography.

The starting trans-hexahydroterephthalic acid ester acid ester mono-acid chlorides as above shown which heretofore were unknown are obtained from trans-hexahydroterephthalic acid hemiesters that can easily be produced by monosaponification of the corresponding di-esters. They may also be prepared, although with less favorable yield, by hydrogenation of the corresponding terephthalic monoesters or by monoesterification of trans-hexahydroterephthalic acid. Thionly chloride is considered most suitable for preparing the new acid chlorides from said mono-esters. It is also possible to cause the new acid chlorides to react with a suitable derivative of the steroid hormone and to prepare the mixed ester desired from the intermediate product obtained. For example, when preparing a 17-trans-hexahydroterephthalate of 17-hydroxyetiocholanone, it is then possible to brominate this compound at the 4- position and to dehydrobrominate the resulting 4-bromo compound with the formation of the desired ester of testosterone.

The new acylated derivatives may be used in the form of their solutions in neutral vegetable oils, to which a glycol may be added, or they may be dissolved in other solvents suitable for injection. The hormone concentrations in said solutions are limited only by the solubility of the new esters. The new esters according to the present invention may be used in the form of thixotropic preparations as they are obtained by adding aluminum monostearate or aluminum 2-ethyl hexanoate to the oily solutions of these esters. They may also be administered in the form of microcrystalline aqueous suspensions or in the form of emulsions of their solutions in a third solvent in water in the presence of a neutral and non-irritating emulsifying agent. Such preparations are prepared according to processes as they are known to the art.

The following examples serve to illustrate the present invention without, however, limiting the same thereto. More particularly, it is possible to vary the solvents and the condensing agents, to work with or without suitable catalysts, and to change the temperature conditions without thereby exceeding the scope of the present invention.

In order to prepare hemiesters of trans-hexahydroterephathalic acids, it is, of course, also possible to directly hydrogenate the corresponding terephthalic acid esters.

When preparing mixed esters according to the present invention one may first prepare the mono-trans-hexahydroterephthalate of the steroid hormone and then esterify the resulting mono-ester to the corresponding diester. Likewise it is possible to cause a hemiester of trans-hexahydroterephthalic acid to react with the steroid hormone in the presence of a suitable esterification catalyst thereby avoiding the use of the acid chloride.

EXAMPLE 1

*Perpartion of the acid chloride of n-butyl trans-hemihexahydroterephthalate*

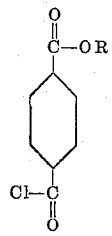

Wherein

R is the n-butyl radical.

(A) PREPARATION OF THE DIMETHYL ESTER OF TEREPHTHALIC ACID

This ester is prepared according to Ulimann and Schlaepfer (Ber. dtsch. Chem. Ges., 1904, 37, 2, 002) by esterifying terephthalic acid with methanol in the presence of sulfuric acid. Starting with 50 g. of terephthalic acid, 43 g. of the crude diester are obtained which is purified by recrystallization from acetone and treatment with charcoal 34 g. of dimethyl terephthalate of the melting point: 140° C. are obtained.

(B) HYDROGENATION OF THE DIMETHYL ESTER OF TEREPHTHALIC ACID

According to Fichter and Holbro (Helv. Chim. Acta, 1938, 21, 141) the diester prepared according to (a) above is hydrogenated in pure 99% acetic acid in the presence of platinum oxide. Starting with 30.4 g. of the dimethyl ester and, after absorption of practically the theoretical quantity of hydrogen, filtration of the solution in order to eliminate the platinum oxide, and evaporation of the acetic acid under vacuum, a light yellow oil is obtained representing a mixture of the cis- and the trans-hexahydroterephthalic dimethyl esters which are formed quantitatively. This ester is sufficiently pure for conversion by hydrolysis into cis- and trans-hexahydroterephthalic acids.

(C) PREPARATION OF TRANS-HEXAHYDROTEREPHTHALIC ACID

According to the method of Fichter and Holbro (Helv. Chim. Acta, 1938, 21, 141) the mixture of the crude dieester obtained according to (B) above is hydrolyzed with 10% hydrochloric acid. The resulting mixture of cis- and trans-hexahydroterephthalic acids is rearranged to trans-hexahydroterephthalic acid by heating with concentrated hydrochloric acid under pressure at a temperature of 125° C. for 15 hours.

In order to hydrolyze the diester mixture, 49.2 g. of the crude product are heated in a boiling water bath with 492 cc. of 10% hydrochloric acid for 4 hours. The oil gradually changes into white crystals. After cooling the hydrolyzed product is centrifuged, washed with water, and dried. The mother liquor yields, on concentration, a second crop of a mixture of cis- and trans-hexahydroterephthalic acids. The total yield is about 40 g.

29 g. of this mixture of isomers are heated in a sealed tube with 35 cc. of concentrated hydrochloric acid at 125° C. for 15 hours. The mixture is then cooled, thereafter the tube is opened, and its contents are centrifuged, washed with a small amount of ice-water, twice pasted with chloroform in order to remove any possible cis-isomer which is very soluble therein, and dried. Thereby, 27.4 g. of trans-hexahydroterephthalic acid are produced having a melting point above 300° C. (with sublimation); yield: 90–91%. The product can be purified by recrystallizing it from boiling water.

(D) PREPARATION OF THE DI N-BUTYL ESTER OF TRANS-HEXAHYDROTEREPHTHALIC ACID

This compound is readily prepared by esterifying trans-hexahydroterephthalic acid obtained according to (C) above with n-butanol in the presence of concentrated sulfuric acid.

The following compounds are mixed and heated under reflux for 4 hours:

Trans-hexahydroterephthalic acid _____ g __ 26.8
Redistilled n-butanol _____ cc __ 100
Concentrated sulfuric acid _____ cc __ 2

After 4 hours of boiling, excess butanol is distilled off in a vacuum. The residue is taken up twice in benzene which is distilled off each time. A light-yellow oil is obtained thereby which is dissolved in 100 cc. of ether. The ethereal solution is washed twice with a solution of 5% sodium carbonate and then with water until the wash water is of neutral reaction. The solution is dried over sodium sulfate, the ether is distilled off and the residue is dissolved in light petroleum ether. The resulting solution is filtered and evaporated to dryness. The oily residue is allowed to cool under refrigeration whereby it crystallizes. The crystals are centrifuged. After drying, 43.5 g. (yield a 98%) of the crude dibutyl ester of the melting point: 30–32° C. are obtained. Said product distills completely at 146–148° C. 0.5 mm. On cooling, the distilled product crystallizes to colorless needles having the same melting point as before. The compound is soluble in alcohol, ether, petroleum ether, acetone, benzene, and chloroform, insoluble in water, aqueous dilute acids, and alkalis. It is a new compound having the following characteristics:

Saponification number as calculated _____ 394
Saponification number as found _____ 387.5–389

(E) PREPARATION OF THE N-BUTYL HEMIESTER OF TRANS-HEXAHYDROTEREPHTHALIC ACID

This compound is prepared by monosaponification of the diester prepared according to (D) above.

12.5 g. of potassium hydroxide dissolved in 30 cc. of water are introduced, while stirring, into a solution of 56.9 g. of the dibutyl ester in 435 cc. of n-butanol. Stirring is continued at room temperature for four days. The butanol is distilled off in a vacuum and the residue is taken up three times in benzene which is distilled each time, thereby producing a white solid residue representing the potassium salt of the desired hemiester. This residue is dissolved in water. The aqueous solution is then washed twice with ether in order to extract non-saponified diester and is acidified by means of concentrated hydrochloric acid until Congo red paper is changed to blue. The n-butyl hemiester is extracted with chloroform. A small amount of dicarboxylic acid precipitates in the aqueous solution, from which it is separated by filtration. The chloroform solution is washed with water until neutral, dried over sodium sulfate, and distilled to dryness. The residue is taken up in light petroleum ether which is removed by vacuum distillation. An almost pure crystallized compound of the melting point: 55–56° C. is obtained thereby. The yield is about 66%. About 10% of the non-converted dibutyl ester are recovered from the ether, with which the aqueous solution of the potassium salt of the hemiester had been washed.

In order to purify the hemiester, it is dissolved in two parts by volume of petroleum ether the boiling range of which is between 35° C. and 75° C. The solution is cooled to a temperature of −30–40° C. and is allowed to crystallize. The crystals are filtered off at said temperature. The compound is obtained in the form of small crystals with the melting point: 56–57° C. It is soluble in organic solvents and dilute alkalis, but insoluble in water and dilute aqueous acids.

Analysis of the resulting compound shows that it corresponds to the formula $C_{12}H_{20}O_4$ with a molecular weight of 228.

Calculated: C, 63.1%; H, 8.8%; O, 28.9%. Found: C, 63.2%; H, 8.9%; O, 28.4%. The resulting hemiester is a new compound.

(F) CONVERSION OF THE n-BUTYL HEMIESTER OF TRANS-HEXAHYDROTEREPHTHALIC ACID INTO ITS MONO-ACID CHLORIDE

Three g. of the n-butyl hemiester of transhexahydroterephthalic acid and 4.4 cc. of thionyl chloride are heated to 50° C. thereby carefully excluding moisture.

After one hour of heating, the temperature of the bath is slowly raised from 50° C. to 80° C. within 45 minutes. Excess thionyl-chloride is distilled off and the residue is taken up twice in 5 cc. of anhydrous benzene. The resulting solution is then distilled. The residue of 3 g. represents the desired acid chloride, which is oily and of light yellow color.

Chemical analysis of said compound shows that it corresponds to the formula $C_{12}H_{19}O_3Cl$ with a molecular weight of 246.7.

Calculated: 14.4% Cl.
Found: 14.0% Cl.

The compound consists to 97% of the pure chloride which decomposes when distillation is attempted. It is used as such for the reaction with testosterone. This product is a new compound.

EXAMPLE 2

*Preparation of the acid chloride of methyl trans-hexahydroterephthlate*

Trans-hexahydroterephthalic acid as prepared according to Example 1, is esterified by means of methyl alcohol in place of butyl alcohol used hereinabove. Monosaponification of the resulting dimethyl trans-hexahydroterephthalate is carried out as described above, but by treatment in methanol. The purified hemiester is caused to react with thionylchloride thereby yielding a crude acid chloride which can be used directly for the condensation with testosterone.

EXAMPLE 3

*Preparation of the acid chloride of isopropyl trans-hemihexahydroterephthalate of the formula*

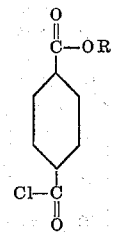

wherein
R is iso-propyl:

(A) PREPARATION OF THE DIESTER 15 g. of trans-hexahydroterephthalic acid, 75 cc. of pure iso-propyl alcohol, and 1.2 cc. of concentrated sulfuric acid are heated under reflux for about four hours.

After elimination of excess iso-propyl alcohol and after a treatment as described above in Example 1 (D), 14.8 g. (66%) of the di-iso-propyl ester of trans-hexahydroterephthalic acid are obtained. This is a new product which melts at 80.5° C. on the Maquenne block and is obtained in the form of small colorless crystals which are insoluble in water, difficultly soluble in ether, but soluble in alcohol, acetone, benzene, and chloroform.

(B) PREPARATION OF THE HEMIESTER

A solution formed by dissolving 12.9 g. of the di-isopropyl ester of trans-hexahydroterephthalic acid in 105 cc. of pure iso-propanol, 2.8 g. of caustic potassium hydroxide, and 3 cc. of water is heated to a temperature of about 60° C. for 2 hours. Iso-propanol is then eliminated by vacuum distillation, whereupon the residue is taken up in 150 cc. of water. Several cc. of an aqueous 10% sodium carbonate solution are added thereto until alkaline. The resulting solution is washed with ether, acidified by the addition of concentrated hydrochloric acid, and extracted with chloroform. The chloroform solution is washed with water, dried over magnesium sulfate, and evaporated to dryness in a vacuum.

6.7 g. (85%) of the iso-propyl hemiester of trans-hexahydroterephthalic acid of the melting point: 88–89° C. on the Maquenne block are obtained. This new product is obtained in the form of colorless needles, insoluble in water, but soluble in alcohol, ether, acetone, benzene, and chloroform.

For purposes of analysis, it is recrystallized from 20 parts by volume of petroleum ether of the boiling range 35–75° C. Its analysis shows that it corresponds to the formula $C_{11}H_{18}O_4$ having a molecular weight of 132.1.

Calculated: C, 61.7%; H, 8.5%; O, 29.8%. Found: C, 61.7%; H, 8.5%; O, 29.8%.

PREPARATION OF ITS ACID CHLORIDE

The procedure described in Example 1(F) is followed by heating the hemiester in the presence of thionylchloride.

EXAMPLE 4

*Preparation of the acid chloride of n-octyl trans-hemihexahydroterephthalate of the formula*

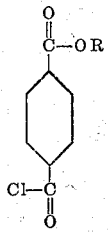

Wherein
R is n-octyl.

(A) PREPARATION OF THE DIESTER

The following reactants are heated under reflux for 3 hours:

Trans-hexahydroterephthalic acid _____ g__ 8
n-Octyl alcohol _____ cc__ 40
Concentrated sulfuric acid _____ cc__ 0.6

The reaction mixture is cooled, neutralized by the addition of 2.5 g. of barium carbonate, and filtered. One part by volume of ether is added to the filtrate. The ether solution is washed with an aqueous 5% sodium carbonate solution and with water, dried over sodium sulfate, and evaporated to dryness in a vacuum. The residue yields after vacuum distillation, 12.6 g. (68%) of the di-n-octyl ester of trans-hexahydroterephthalic acid.

Said new compound is obtained in the form of a colorless oil the boiling range of which is 200–225° C./0.8 mm. It is insoluble in water and soluble in organic solvents. It is sufficiently pure for subsequent conversion into the hemiester.

(B) PREPARATION OF THE HEMIESTER

A solution consisting of 10 g. of the di-n-octyl ester of trans-hexahydroterephthalic acid, 50 cc. of n-octyl alcohol, 1.51 g. of caustic potassium hydroxide, and 2 cc. of water is allowed to stand at room temperature for 48 hours. The n-octyl alcohol is eliminated by vacuum distillation. 200 cc. of water are added to the residue. The resulting solution is washed with ether, acidified with concentrated hydrochloric acid, and extracted with chloroform. The chloroform solution is washed with water, dried over magnesium sulfate, and evaporated to dryness in a vacuum.

Thereby, 4.2 g. (58%) of the n-octyl hemiester of trans-hexahydroterephthalic acid, having a melting point of 50° C. on the Maquenne block, are obtained. This compound which has not been described heretofore, is crystalline, insoluble in water, but soluble in organic solvents such as alcohols, benzene, chloroform. For analytical purposes it is recrystallized from one part by volume of petroleum ether having a boiling point of 35–75° C.

Its chemical analysis shows that it corresponds to the formula $C_{16}H_{28}O_4$ of the molecular weight as 284.2.

Calculated: C, 67.6%; H, 9.9%; O, 22.5%. Found: C, 67.8%; H, 10.1%; O, 22.7%.

C

The preparation of the acid chloride is effected by proceeding as described in Example 1(F), by heating the hemiester in the presence of thionylchloride.

EXAMPLE 5

Preparation of the testosterone ester of mono-n-butyl trans-hexahydroterephthalate of the formula

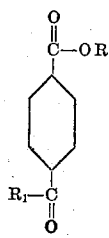

Wherein

R is n-butyl, and
$R_1$ is the testosterone residue of the formula

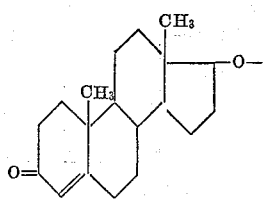

2 g. of testosterone are dissolved in 3 cc. of pyridine. 2.1 g. of the acid chloride of the hexahydroterephthalic acid n-butyl hemiester prepared according to Example 1, are dissolved in 2 cc. of benzene. The solution is slowly added to the testosterone solution while stirring and cooling the reaction vessel in an ice bath. The reaction is exothermic. Pyridine hydrochloride precipitates rapidly. The resulting pinkish reaction mixture is allowed to stand for 24 hours. It is then stirred or shaken with 20 cc. of water for 15 minutes in order to destroy excess acid chloride, and is extracted with di-isopropyl ether. The ethereal solution is washed with hydrochloric acid, then with sodium carbonate, and finally with water until neutral. The washed solution is dried over sodium sulfate, and the ether is distilled off. A crystalline residue melting at about 95° C. is obtained which represents the crude mixed ester. On subjecting said ester to chromatography in benzene solution over alumina and eluting with the same solvent, a fraction melting between 70° C. and 95° C. is obtained. A second eluate obtained with benzene containing 10% of diethyl ether melts between 100° C. and 110° C.

Each of these fractions is again subjected to chromatography whereby as main product a compound of the melting point 110° C. is obtained with a total yield of about 60%. This compound represents the desired 17-testosterone ester of mono-n-butyl trans-hexahydroterephthalate. Its melting point does not increase on recrystallization from petroleum ether of the boiling point 50–70° C. followed by recrystallization from 50% ethanol. The compound is obtained in the form of small colorless crystals with a melting point of 110° C., $[\alpha]_D^{20}=81.5°$ ($c=1\%$, ethanol). It is very soluble in all organic solvents except petroleum ether. Its solubility in olive oil is 10% which compares favorably with that of other esters of testosterone.

Its chemical analysis shows that it corresponds to the formula $C_{31}H_{46}O_5$ and the molecular weight of 498.6.

Calculated: C, 74.66%; H, 9.29%; O, 16.04%. Found: C, 74.9%; H, 9.3%; O, 16.3%.

On testing this compound on the castrated male rat for its effect on the weight of the seminal vesicles, it was found that with a dose corresponding to 17 mg. of testosterone (30 mg. of mixed ester) the average weight of the vesicles at the end of 10 days is 635 mg., at the end of 17 days, 666 mg. and at the end of 24 days 621 mg.

If an equivalent dose of testosterone propionate is administered, namely, 20.8 mg., the respective weights are 299 mg., 48 mg., and 30 mg., which proves that the new product has a much greater as well as more prolonged activity. Using testosterone oenanthate, again with a dose equivalent to 17 mg. of testosterone, namely, 24.1 mg. of the oenanthate, the corresponding values are 452 mg., 514 mg., and 465 mg. The superiority of the new product thus is clearly established.

EXAMPLE 6

Preparation of the 17-estradiol ester of mono-n-butyl trans-hexahydroterephthalate of the formula

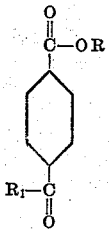

Wherein

R is n-butyl, and
$R_1$ is the estradiol residue of the formula

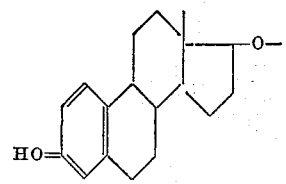

1.25 g. of the n-butyl hemiester of trans-hexahydroterephthalic acid prepared according to Example 1 and 5 cc. of thionylchloride are heated under reflux for half an hour. Excess chlorinating agent is removed by vacuum distillation, whereupon the residue is taken up in 6 cc. of benzene. The resulting solution is cooled to 10° C. and poured into a solution of 1.14 g. of estradiol-3-monoacetate in 5.7 cc. of pyridine cooled to 10° C. The mixture is allowed to stand at room temperature for two hours, whereafter 1 cc. of water is added. It is then poured into N hydrochloric acid and extracted with chloroform. The combined extracts are washed with water and with N/5 sodium hydroxide solution, dried over magnesium sulfate, and evaporated to dryness in a vacuum. The residue is taken up in 40 cc. of ethanol, to which 0.5 cc. of sodium hydroxide solution had been added. The mixture is allowed to stand at 20° C. for half an hour, poured into water, acidified with concentrated hydrochloric acid, and extracted with ether. The combined ethereal extracts are dried and evaporated to dryness.

Thereby a colorless residue is obtained which crystallizes when taken up in 90% methanol. The yield is 1.1 g. (60%) of the 17-estradiol ester of mono-n-butyl trans-hexahydroterephthalate of the melting point 136° C., $[\alpha]_D^{20} = +45° \pm 2$ (C=0.5%, ethanol). The compound is obtained in the form of fine, thin, colorless needles which are insoluble in water but soluble in acetone, benzene, chloroform, and very soluble in ether. The ester is a new product.

Its chemical analysis shows that it corresponds to the formula $C_{30}H_{42}O_5$ and the molecular weight as 482.6.

Calculated: C, 74.6%; H, 8.8%. Found: C, 74.6%; H, 8.8%.

EXAMPLE 7

*Preparation of the 21-cortisone ester of mono-n-butyl trans-hexahydroterephthalate of the formula*

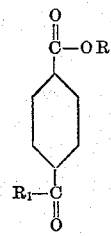

Wherein

R is n-butyl, and
$R_1$ is the cortisone residue of the formula:

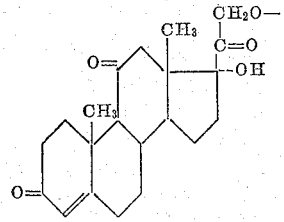

The procedure of preparing this ester is the same as in the preceding example. 1 g. of the n-butyl hemiester of trans-hexahydroterephthalic acid are reacted with 4 cc. of thionylchloride. The acid chloride is dissolved in 5 cc. of benzene, and 1 g. of cortisone in 5 cc. of pyridine are added thereto at room temperature.

When the reaction is completed, 1 cc. of water is added, and the resulting solution is poured into N hydrochloric acid. The reaction product is extracted with chloroform, washed with water, with N sodium carbonate solution, again with water, dried over magnesium sulfate, and evaporated to dryness. The residue is taken up in a mixture of 60 cc. of ethanol and 6 cc. of chloroform. A solution of 150 mg. of sodium periodate and 1.5 cc. of N sulfuric acid in 10 cc. of water is added thereto and the mixture is allowed to stand at 25° C. for half an hour. The mixture is then poured into water and extracted with chloroform. The extract is washed with water and dried over magnesium sulfate. Chromatographic purification is effected over 40 g. of neutral alumina. On elution with a 10% methanol solution in chloroform, evaporation of the eluate to dryness, and recrystallization from aqueous acetone, 750 mg. (50%) of the 21-cortisone ester of mono-n-butyl trans-hexahydroterephthalate of the melting point: 189° C.;

$$[\alpha]_D^{20} = +148° \pm 2$$

(c=0.5% acetone) are obtained. This compound which is new, is obtained in the form of colorless leaflets which are insoluble in water, difficultly soluble in alcohol and ether, and soluble in acetone, benzene, and chloroform.

The chemical analysis shows that the ester corresponds to $C_{33}H_{46}O_8$ and the molecular weight 570.7.

Calculated: C, 69.4%; H, 8.1%; O, 22.4%. Found: C, 69.2%; H, 8.2%; O, 22.8%.

EXAMPLE 8

*Preparation of the 21-prednisone ester of mono-n-butyl trans-hexahydroterephthalate of the formula*

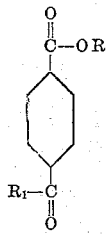

Wherein

R is n-butyl, and
$R_1$ is the prednisone residue of the formula:

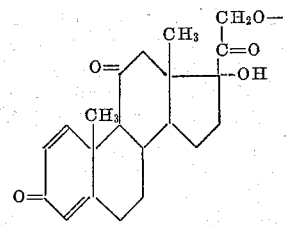

The procedure of preparing said ester is substantially the same as described in Example 6.

1.5 g. of the n-butyl hemiester of trans-hexahydroterephthalic acid and 6 cc. of thionylchloride are reacted and the resulting acid chloride is taken up in 7.5 cc. of benzene. 1.5 g. of prednisone, or $\Delta^1$-dehydrocortisone, in 7.5 cc. of pyridine are added thereto at room temperature.

When the reaction is completed, 1 cc. of water is added. The reaction mixture is poured into N hydrochloric acid and is extracted with chloroform. The combined extracts are washed with water and with N sodium hydroxide solution, dried over magnesium sulfate, and subjected to cromatographic purification over 40 g. of neutral alumina. Elution with chloroform produces, after evaporation of the eluate to dryness and recrystallization from ether, 800 mg. (50%) of the 21-prednisone ester of the mono-n-butyl trans-hexahydroterephthalate having a melting point of 189° C.; $[\alpha]_D^{20} = +140° \pm 2$ (c=0.5% acetone).

This compound which is new is obtained in the form of colorless leaflets. It is insoluble in water, difficultly soluble in ether, but soluble in alcohol, acetone, benzene, and chloroform.

The chemical analysis of the compound shows that it corresponds to the formula $C_{33}H_{44}O_8$ and a molecular weight of 568.7.

Calculated: C, 69.7%; H, 7.8%. Found C, 69.8%; H, 8.0%.

EXAMPLE 9

*Preparation of the testosterone ester of mono-methyl trans-hexahydroterephthalate of the formula*

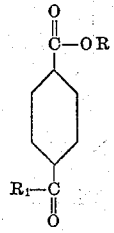

Wherein

R is methyl, and
R₁ is the testosterone residue of the formula:

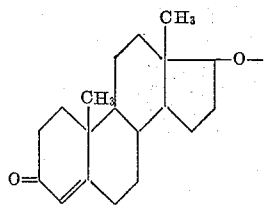

The procedure of making this ester is the same as described in Example 5.

1 g. of the methyl hemiester of trans-hexahydroterephthalic acid prepared in according to Example 2 is reacted with 4 cc. of thionylchloride. The resulting acid chloride is taken up in 5 cc. of benzene and 1 g. of testosterone in 5 cc. of pyridine is added thereto at room temperature.

After the reaction is completed, 1 cc. of water is added. The mixture is poured into N hydrochloric acid and extracted with chloroform. The combined extracts are washed with water and with N sodium hydroxide solution, dried over magnesium sulfate, and evaporated to dryness in a vacuum. The resulting residue is recrystallized from aqueous methanol to produce 1.1 g. (70%) of the 17-testosterone ester of monomethyl trans-hexahydroterephthalate of the melting point: 161° C.;

$$[\alpha]_D^{20} = +96° \pm 2°$$

($c=0.5\%$, chloroform).

This ester which is new is obtained in the form of colorless leaflets which are insoluble in water and soluble in alcohol, ether, acetone, benzene, and chloroform.

The chemical analysis of the compound shows that it corresponds to the formula $C_{28}H_{40}O_5$ with a molecular weight of 456.6.

Calculated: C, 73.6%; H, 8.8%; O, 17.5%. Found: C, 73.6%; H, 8.9%; O, 17.9%.

EXAMPLE 10

*Preparation of the testosterone ester of mono-isopropyl trans-hexahydroterephthalate of the formula*

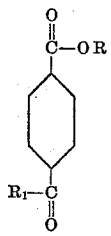

Wherein

R is isopropyl, and
R₁ is the testosterone residue of the formula:

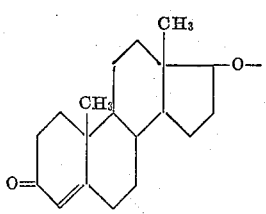

The procedure of preparing this ester is the same as described in Example 5.

1.5 g. of the iso-propyl hemiester of trans-hexahydroterephthalic acid prepared according to Example 3 are reacted with 6 cc. of thionylchloride. The resulting acid chloride is taken up in 6 cc. of benzene and 1 g. of testosterone in 5 cc. of pyridine is added at room temperature.

When the reaction is completed, the benzene solution is washed with water, with 2 N hydrochloric acid, again with water, with sodium bicarbonate solution and finally with water. The washed solution is dried over magnesium sulfate and is subjected to chromatography over 30 g. of neutral alumina. Elution with ether yields, after evaporation of the eluate to dryness and recrystallization of the residue from di-isopropyl ether, 500 mg. (30%) of the 17-testosterone ester of mono-isopropyl trans-hexahydroterephthalate having a melting point of 156–157° C.; $[\alpha]_D^{20} = +89° \pm 2$ ($c=0.5\%$, chloroform).

This product which is new is obtained in the form of colorless leaflets which are insoluble in water, very soluble in benzene and chloroform, and difficultly soluble in di-iso-propyl ether.

The chemical analysis of the compound shows that it corresponds to the formula $C_{30}H_{44}O_5$ with a molecular weight of 484.6.

Calculated: C, 74.3%; H, 9.2%; O, 16.5%. Found: C, 74.3%; H, 9.2%; O, 16.8%.

EXAMPLE 11

*Preparation of n-butyl-19-nor-testosterone trans-hexahydroterephthalate*

2.03 g. of 19-nor-testosterone (melting point: 123–124° C.) are dissolved in 5 cc. of pyridine. The solution is cooled in an ice bath. The acid chloride of the n-butyl trans-hemihexahydroterephthalate prepared according to Example 1(*f*) is dissolved in 5 cc. of benzene in an amount corresponding to 2.5 g. of n-butyl trans-hemihexahydroterephthalate. Pyridine hydrochloride precipitates immediately. The mixture is allowed to stand at room temperature for 20 hours. 30 cc. of water are added to dissolve the pyridine hydrochloride and to decompose excess acid chloride and the mixture is extracted with benzene. The benzene solution is washed with dilute hydrochloric acid, with water, with sodium bicarbonate solution, again with water, and is finally dried over sodium sulfate. The benzene solution is chromatographed over alumina.

Elution with benzene containing about 10% by volume of ether yields about 1.5 g. of a gummy product which is dissolved in hot petroleum ether of the boiling range 35–75° C., and crystallizes on cooling. The crystals are filtered off and dried yielding 0.9 g. of the 19-nor-testosterone ester of mono-n-butyl trans-hexahydroterephthalate of the melting point 88° C.; $[\alpha]_D^{20} = +49° \pm 3°$ ($c=0.5\%$, chloroform). The ester is soluble in all organic solvents and in vegetable oils, insoluble in water, dilute acids, and alkalis. The new ester may be recrystallized from hexane without change in the melting point.

The chemical analysis of the ester shows that it corresponds to the formula $C_{30}H_{44}O_5$ with a molecular weight of 484.65.

Calculated: C, 74.34%; H, 9.15. Found: C, 74.5%; H, 9.2%.

This 19-nor-testosterone ester of mono-n-butyl trans-hexahydroterephthalate of the present invention possesses a very specific and entirely unexpected activity in contrast to the most closely related cycloaliphatic carboxylic acid, the hexahydrobenzoate of similar constitution. For instance, the new compound has a very surprising progestational activity which is very similar to that of progesterone while the hexahydrobenzoate does not have such an activity. That esterification of 19-nor-testosterone with the n-butyl hemiester of trans-hexahydroterephthalic acid would yield an ester with such a progestational activity could not at all be expected.

Furthermore, the new ester, in contrast to the hexahydrobenzoate, has a pronounced inhibitory effect upon the pituitary gland and thus, inhibits an increase in the gonadotropic activity of the pituitary gland in castrated animals. This is also quite unexpected and unobvious.

The following animal tests demonstrate these unexpected results of said ester.

Male rats were castrated at the age of 4½ weeks.

Each rat received at the age of 7½ weeks either 2.8 mg. of 19-nor-testosterone hexahydrobenzoate or 3.5 mg. of n-butyl-19-nor-testosterone trans-hexahydroterephthalate according to the present invention, the amounts corresponding to the same amount of 19-nor-testosterone.

Representatives from each group were sacrificed and examined at the end of 9, 10, 11, and 12 weeks.

The results obtained with the two esters studied are summarized in the following tables.

TABLE 1

| Organs | | Age of rats in weeks | | | |
|---|---|---|---|---|---|
| | Treated at 7½ weeks | 9 | 10 | 11 | 12 |
| Seminal vesicles | Controls | 7 | 7.4 | 9.4 | 6.9 |
| | A | 29.1 | 30.5 | 21.1 | 20.5 |
| | B | 33 | 24.8 | 20.7 | 20.7 |
| Rf | Controls | 4.6 | 4.0 | 4.8 | 4.7 |
| | A | 5.9 | 5.2 | 4.6 | 4.6 |
| | B | 4.8 | 4.6 | 4.3 | 4.7 |
| Rs | Controls | 1.0 | 0.8 | 0.9 | 1.0 |
| | A | 1.3 | 1.1 | 1.0 | 1.0 |
| | B | 1.1 | 1.0 | 1.0 | 1.0 |
| Lf | Controls | 0.17 | 0.2 | 0.2 | 0.17 |
| | A | 1.0 | 0.74 | 0.55 | 0.44 |
| | B | 0.70 | 0.42 | 0.35 | 0.20 |
| Ls | Controls | 0.04 | 0.04 | 0.04 | 0.04 |
| | A | 0.24 | 0.17 | 0.12 | 0.10 |
| | B | 0.18 | 0.10 | 0.08 | 0.06 |
| Percentage of pituitary hormonal activity as compared with the controls. | B | +16 | −21 | −34 | −1.9 |

A = Hexahydrobenzoate of 19-nor-testosterone.
B = n-Butyl-19-nor-testosterone trans-hexahydroterephthalate.
Rf = Ratio of weight of freshly removed kidney×$10^3$ to body weight.
Rs = Ratio of weight of dry kidney×$10^3$ to body weight.
Lf = Ratio of weight of freshly removed levator ani muscle×$10^3$ to body weight.
Ls = Ratio of weight of dry levator ani muscle×$10^3$ to body weight.

The percentage of pituitary hormone activity is obtained by comparing the average weight of the ovaries of immature female rats injected with pituitary glands of castrated control male rats or treated according to the technique of Junegk (Proc. Exp. Biol., Vol. 69 (1948), page 527).

TABLE 2

*Progestomimetic action—Clauberg's test*

| Treatment | Amount of compound per injection, mg. | Number of injections | Results |
|---|---|---|---|
| Progesterone | 20 | 1 | Very pronounced proliferation; typical progestational condition. |
| A | 20 | 1 | Only slight proliferation of variable degree. |
| B | 20 | 1 | Pronounced proliferation. |

A = Hexahydrobenzoate of 19-nor-testosterone.
B = n-Butyl-19-nor-testosterone trans-hexahydroterephthalate.

TABLE 3

*Maintenance of gestation—retarding effect in the castrated rabbit*

| Treatment | Amount of compound injected | Results |
|---|---|---|
| Progesterone | 20 mg. every 5 days | Sub-normal gestation. |
| A | do | Abortion. |
| B | do | Partial gestation. |

A = Hexahydrobenzoate of 19-nor-testosterone.
B = n-Butyl-19-nor-testosterone trans-hexahydroterephthalate.

These results show—

(a) that the androgenic activity of both compounds is rather slight;
(b) that the claimed ester has a lower anabolic activity than the hexahydrobenzoate;
(c) that its renotropic activity is not greater than that of the hexahydrobenzoate;
(d) but that its progestational activity is similar to that of progesterone and represents a true progestational activity;
(e) that it also has an interesting inhibitory effect on the pituitary gland not observed with the hexahydrobenzoate. Its inhibiting effect on the increase in gonadotropic activity of the pituitary gland of castrated animals is at a maximum about 3 weeks after the injection and amounts to −34%.

As stated above, the comparative tests were carried out with the hexahydrobenzoates of steroid hormones because such esters are superior to any other heretofore known esters and also to the cyclopentyl proprionates which are considered to be the most effective esters with prolonged activity that are actually used in therapy. That the hexahydrobenzoates have far superior properties will become evident from the following comparative tests with prednisone hexahydrobenzoate and prednisone cyclopentyl propionate.

The products were injected subcutaneously into rats, weighing approximately 80 g., at the rate of 32.8 mg. of prednisone hexahydrobenzoate and 33.8 mg. of prednisone cyclopentylpropionate, doses which correspond to 25 mg. of free hormone, dissolved in olive oil containing 10% of benzyl alcohol.

A third group of animals was given a solvent injection (4 cc. of olive oil containing 10% of benzyl alcohol) and served as a control group.

After a single injection under the conditions described above, the weight of the thymus was checked on the fourth, eighth and twelfth day.

The control animals show little change, the average weight of the thymus ranging from 365 to 320 mg. per 100 g. of body weight.

The weight of the thymus of the animals treated with prednisone cyclopentylpropionate was 365 mg. at the time of injection and had decreased to 90 mg. at the end of the fourth day, had increased to 210 mg. on the eighth day and to 245 mg. on the twelfth day (per 100 g. of body weight).

The corresponding weights of the group of animals injected with the hexahydrobenzoate were:

365 mg. at the time of injection;
70 mg. at the end of 4 days;
78 mg. at the end of 8 days;
105 mg. at the end of 12 days;
   (Per 100 g. of body weight).

These figures clearly prove the greater retarding action of prednisone hexahydrobenzoate over the corresponding cyclopentylpropionate.

Saponification of prednisone hexahydrobenzoate by means of sodium hydroxide solution proceeds also much more slowly with prednisone hexahydrobenzoate than with prednisone cyclopentyl propionate. The following table shows the percentage of saponification for each ester.

| Saponification duration at 0° C. | Percent saponification of | |
| --- | --- | --- |
| | Cyclopentyl propionate of prednisone | Hexahydrobenzoate of prednisone |
| 5 minutes | 40 | 24 |
| 10 minutes | 61 | 44 |
| 30 minutes | 77 | 63 |

The steroid hormone esters of trans-hexahydroterephthalic acid mono-alkyl esters according to the present invention exhibit an even more prolonged activity than the corresponding hexahydrobenzoates and, in addition thereto, have a high solubility in the solvents used for preparing injectable preparations.

We claim:

The 19-nor-testosterone ester of trans-hexahydroterephthalic acid mono-n-butyl ester.

No references cited.

UNITED STATES PATENT OFFICE
CERTIFICATION OF CORRECTION

Patent No. 3,006,928            October 31, 1961

Andre Allais et al.

It is hereby certified that error appears in the above numbered patent requiring correction and that the said Letters Patent should read as corrected below.

Column 2, line 31, strike out "acid ester"; line 36, for "Thionly" read -- Thionyl --; column 3, lines 3 and 4, for "trans-hexahydroterephathalic" read -- trans-hexahydroterephthalic --; line 15, for "Perpartion", in italics, read -- Preparation --; in italics; line 27, for "Wherein" read -- wherein --; same column 3, line 39, after "charcoal" insert a period; column 6, line 51, column 7, line 44, and column 8, line 51, for "Wherein", each occurrence, read -- wherein --; same column 8, lines 56 to 63, the formula should appear as shown below instead of as in the patent:

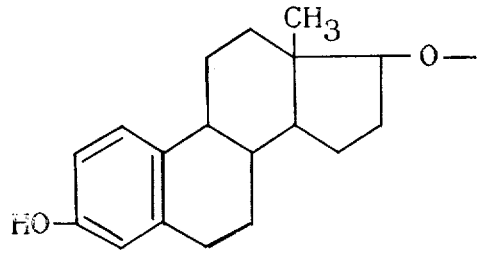

column 9, line 36, and column 10, line 23, for "Wherein", each occurrence, read -- wherein --; same column 10, line 47, for "cromatographic" read -- chromatographic --; column 11, line 1, for "Wherein" read -- wherein --; line 18, strike out "in"; same column 11, line 59, for "Wherein" read -- wherein --.

Signed and sealed this 10th day of April 1962.

Attest:

ERNEST W. SWIDER            DAVID L. LADD
Attesting Officer            Commissioner of Patents